UNITED STATES PATENT OFFICE.

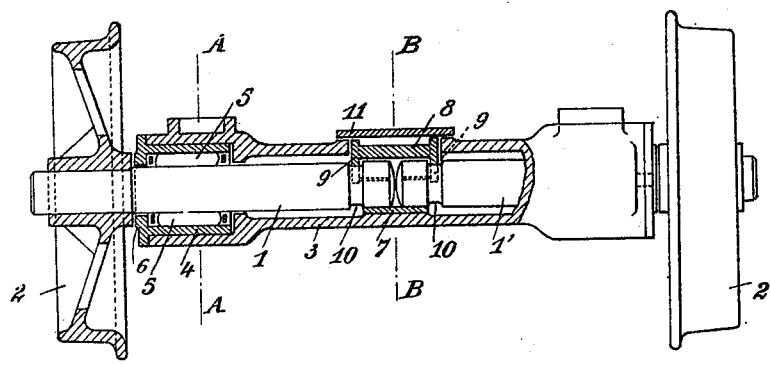

EDMOND LECLERCQ, OF HAINE-ST.-PAUL, BELGIUM.

CAR-TRUCK.

1,322,587.     Specification of Letters Patent.     Patented Nov. 25, 1919.

Application filed May 29, 1919. Serial No. 300,644.

*To all whom it may concern:*

Be it known that I, EDMOND LECLERCQ, a subject of the King of the Belgians, residing at Haine-St.-Paul, Belgium, have invented certain new and useful Improvements in and Relating to Car-Trucks, of which the following is a specification.

The object of my invention is to provide an improved car-truck applicable to all kinds of tramway, railway or other cars, and more particularly a car-truck in which the axle of a pair of wheels is made of two parts rotating independently in a stationary casing on which the car-frame is secured, the two halves of the axle being held in said casing by means of a central bearing, the upper part of which is provided with projections engaging annular grooves provided in both halves of the wheel axle.

The invention is illustrated in the accompanying drawings, in which:

Figure 1.— is a longitudinal section of the wheel-axle with parts shown in elevation, Fig. 2.— is a cross-section on line A—A of Fig. 1, Fig. 3.— is a cross-section on line B—B of Fig. 1.

The improved wheel-axle is formed of two halves, 1', each of which carries a wheel 2 keyed onto the axle in the usual way. The two halves of the axle rotate in a stationary casing 3 made of a single piece, to which the frame of the car is secured in any suitable manner.

Each end of the casing 3 is provided with an inner bearing sleeve 4 for rollers 5. Said bearing sleeve has an outer rim portion 6 engaging the surface of the axle with smooth friction. Owing to this arrangement the casing 3 has an unlimited life (said sleeve 4 being interchangeable) and the joints, stuffing-boxes or the like which are effective only during a few days owing to their flattening by lateral shocks and jerks, are advantageously omitted.

The inner end of each axle half rotates in a central bearing 7, surrounding a little more than one half of the circumference of the axle and coöperating with an upper bearing portion 8, provided with lateral projections 9 engaging an annular groove 10 in the end of each axle-half. Access is afforded to the entire bearing 7, 8 through an opening provided in the casing 3 and normally closed by a suitable cover 11.

Said central bearing which is fully lubrified has to withstand but weak strain; it holds the two halves of the axle at the normal distance apart from each other. The arrangement of said bearing enables the two halves of the axle to be rapidly removed without it being necessary to unkey the wheels, in contradistinction to any other known arrangement. It is a well-known fact that after a wheel of a truck or lorry has been unkeyed only a single time, it can no more be effectively tightened on the axle, there will be a certain slip between the wheel and the axle and this slip will be rapidly increased and the truck soon be put out of service.

If a wheel of the truck is broken by an abnormal shock, it will be sufficient to replace one half of the axle.

On the other hand cars provided with my improved arrangement are capable of running through curves of very small radius. This is a special advantage for lorries used in mine-works, said lorries when provided with my invention being capable of being moved with the greatest ease on the pit-mouth.

Having fully described my invention, what I claim and desire to secure by Letters Patent is:

In a car-truck, the combination with a pair of wheels, of an axle formed of two independent sections, a stationary casing wherein said axle-sections are rotated, a suitable central bearing capable of holding said sections in said bearing, a removable roller bearing sleeve within each end of the latter, a lateral vertical rim at the outer end of each sleeve, said rim engaging the surface of the axle with smooth friction, substantially as set forth.

In testimony whereof I affix my signature in presence of two witnesses.

EDMOND LECLERCQ.

Witnesses:
  J. WAGNER,
  F. Y. ZABAUL.